United States Patent [19]

Walden

[11] 4,116,412

[45] Sep. 26, 1978

[54] RESILIENT MOUNTING FOR AN OPERATOR'S STATION ON A VEHICLE

[75] Inventor: Gerald M. Walden, Chillicothe, Ill.

[73] Assignee: Caterpillar Tractor Co., Peoria, Ill.

[21] Appl. No.: 815,953

[22] Filed: Jul. 15, 1977

[51] Int. Cl.² .......................................... B62D 23/00
[52] U.S. Cl. ............................... 248/358 R; 280/756; 296/28 C; 296/35 R; 296/102
[58] Field of Search .................. 180/89.1, 89.12–89.19; 214/DIG. 7; 248/356, 358 R; 280/756; 296/28 C, 35 R, 102; 403/379

[56] References Cited

U.S. PATENT DOCUMENTS

| | | | |
|---|---|---|---|
| 2,841,354 | 7/1958 | Humble | 248/358 R |
| 3,036,858 | 5/1962 | Fingerut | 296/102 |
| 3,560,019 | 2/1971 | Moore | 296/102 X |
| 3,606,437 | 9/1971 | Pierce | 296/35 R |
| 3,612,581 | 10/1971 | Frankenberg et al. | 296/102 X |
| 3,623,754 | 11/1971 | Moore | 296/102 X |
| 3,754,315 | 8/1973 | Heitman | 296/102 X |
| 3,940,177 | 2/1976 | Miers et al. | 296/28 C X |
| 4,053,178 | 10/1977 | York et al. | 296/35 R X |

FOREIGN PATENT DOCUMENTS

| | | | |
|---|---|---|---|
| 110,192 | 4/1940 | Australia | 296/35 R |
| 823,517 | 10/1937 | France | 248/358 R |
| 2,220,708 | 10/1974 | France | 296/35 R |
| 2,148,126 | 4/1973 | Fed. Rep. of Germany | 296/28 C |
| 1,374,698 | 11/1974 | United Kingdom | 180/89.14 |

Primary Examiner—Lawrence J. Staab
Attorney, Agent, or Firm—Phillips, Moore, Weissenberger, Lempio & Majestic

[57] ABSTRACT

A mounting removably associates a first structure such as a construction vehicle with a second structure such as an operator station which may include a roll-over protective device. The mounting includes a first hollow member affixed to the first structure and a second member disposed in and affixed to the first member. Fastening the second member to the first member is a resilient bushing oriented transversely to the main load along with separate annular resilient members, all to dampen transmission of vibrations in the first member to the second member. The second structure is removably affixed to the second member by a tapered socket fitting a tapered end of the second member.

12 Claims, 5 Drawing Figures

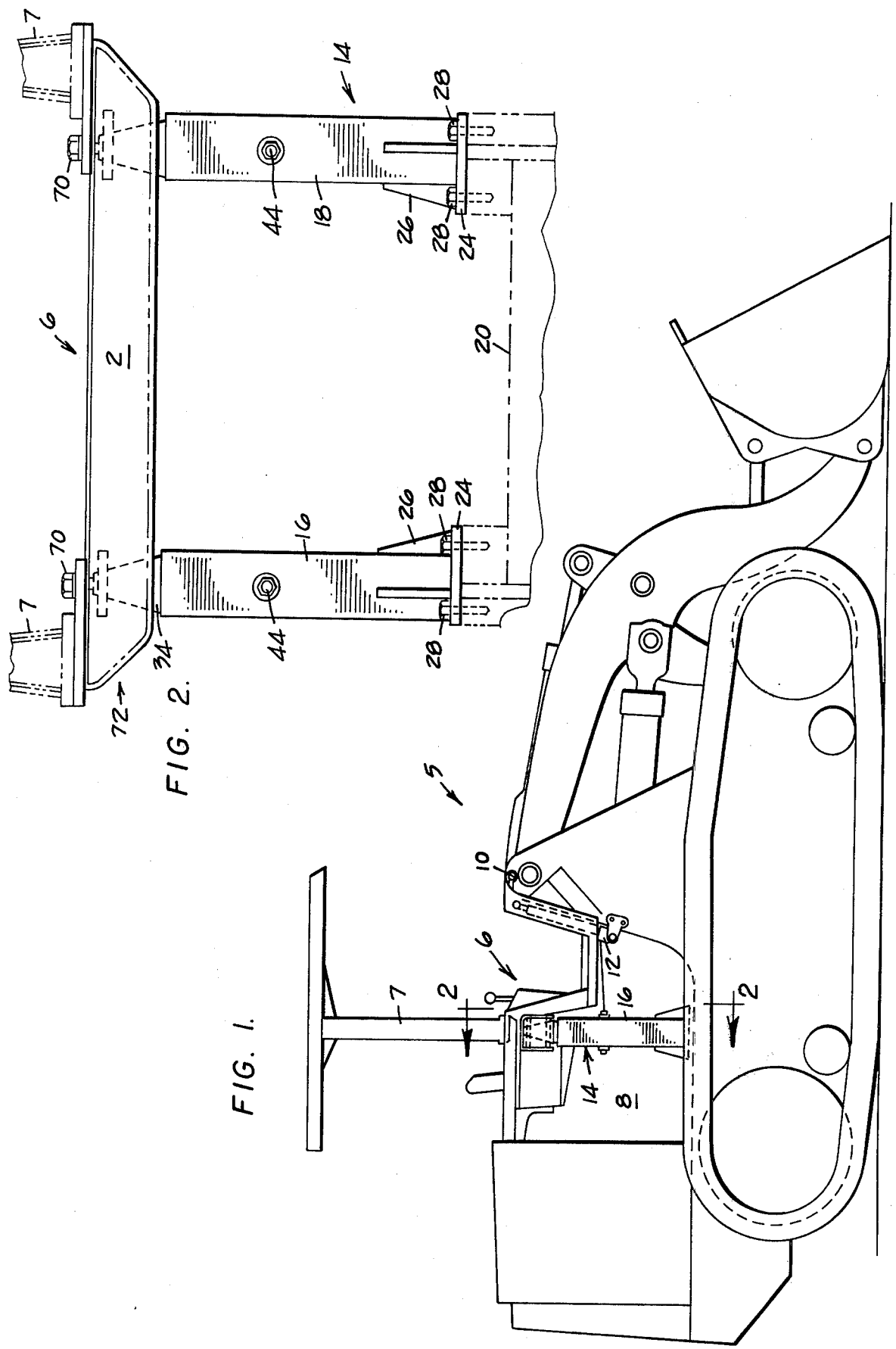

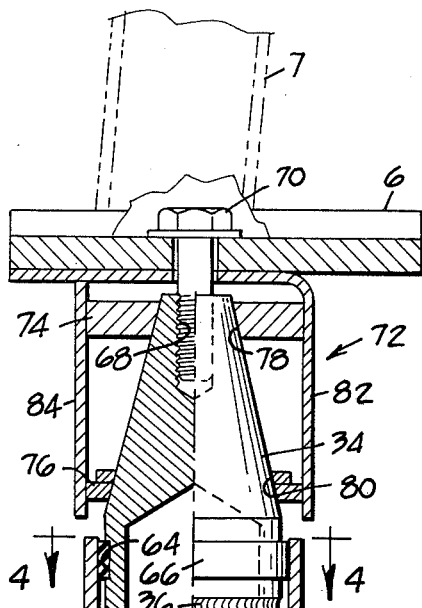
FIG. 3
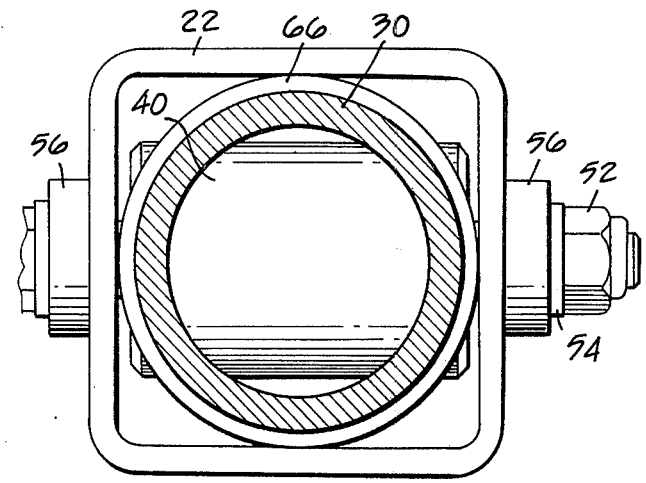
FIG. 4.
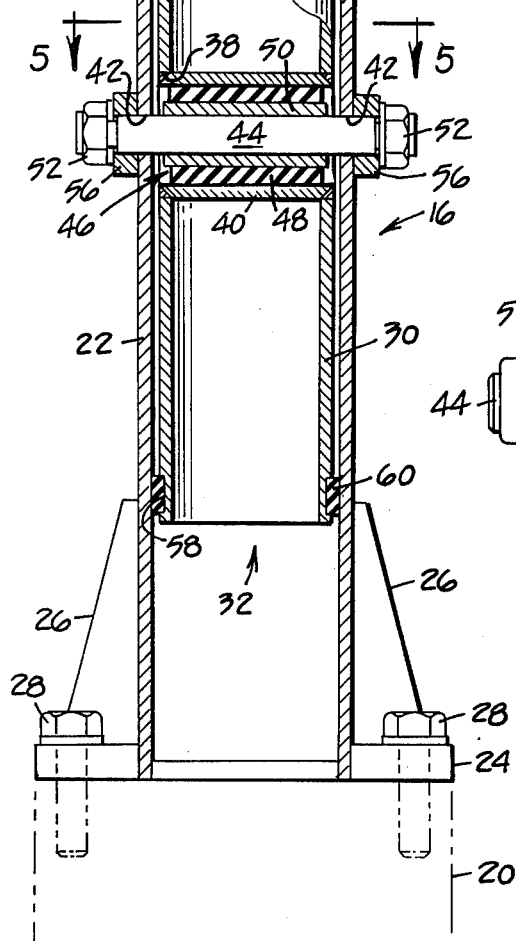
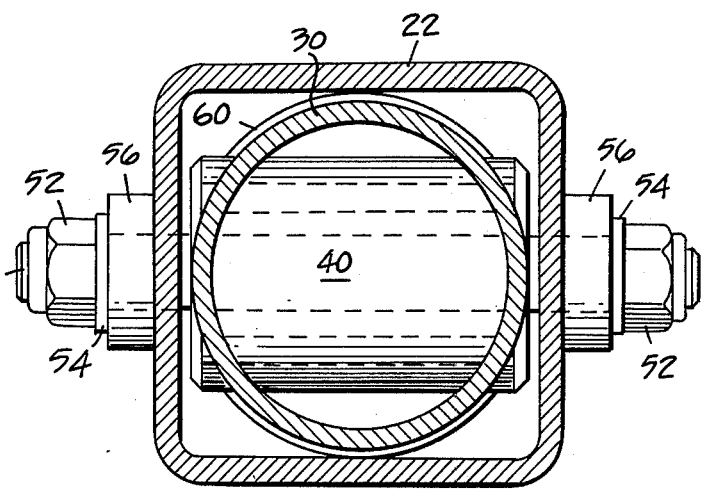
FIG. 5.

RESILIENT MOUNTING FOR AN OPERATOR'S STATION ON A VEHICLE

BACKGROUND OF THE INVENTION

This invention relates to a resilient vibration-dampening mounting which may be used to mount an operator station and an associated roll-over protective structure on a construction vehicle.

Operator stations of construction equipment and the like generally cover certain equipment necessary for operation of the vehicle. Failure of these equipments or maintenance required to be performed on these equipments may necessitate the removal of the operator station from the vehicle.

In any vehicle, whether it be a construction vehicle or material handling vehicle, vibration is imparted to the vehicle frame due to operation. In construction vehicles which may be operated over unimproved terrain, the vibration may be fatiguing to the operator if it is not dampened. Although normal seat padding may dampen some vibration, the remaining vibration may still reach the operator without additional dampening means in the mounting itself. Since vibration may affect instruments and the like, it has been found appropriate to isolate the entire operator's station from the vehicle frame through the use of resilient mountings.

Resilient mountings have taken many forms in view of the varying conditions under which they are utilized. In construction equipment, as noted previously, the operator's station, which is to be isolated from unwanted vibrations, should also be readily detachable from the vehicle; however, addition of the protective structures to the vehicle to prevent injury to the operator in the event of the vehicle rolling over has added considerable weight to the operator's station. The roll-over protective structure may also raise the center of gravity in addition to the added weight and therefore the whole operator's station may become unwieldy without mechanical means to pivotally move the operator's station away from the vehicle for maintenance. Such a structure is disclosed in application Ser. No. 614,812, now U.S. Pat. No. 4,053,178, assigned to the assignee of this invention.

In affixing a roll-over protective structure to a construction vehicle, it is necessary to take into account the vertical load imparted by the operator's station to which the roll-over structure may be affixed and which imparts a static load on any vibration-dampening element between the vehicle and the operator's station. The design must also take into account dynamic sideloads imposed upon the mounting structure in the event that the vehicle rolls over. By its very purpose, the roll-over protective structure must not fail during roll-over of the vehicle. Accordingly, it is appropriate to insure that the mounting is sufficiently strong to prevent failure because of dynamic sideloading during the roll-over period.

As previously noted, it is important to insure that a mounting for an operator's station and a roll-over protective structure is relatively easily disassembled. If the entire weight of the structure in a static condition is imparted to a horizontally oriented pin or bolt, it becomes necessary for the maintenance personnel to relieve the weight imparted to such a bolt before the bolt or pin may be removed. This is accomplished in earlier devices such as application Ser. No. 614,812 by providing a metal-to-metal contact and a locking pin positioned below the resilient mounting member so that the locking pin may be removed separately from the resilient mounting member. Although this structure is adequate, it must, of necessity, be massive.

SUMMARY OF THE INVENTION

The present invention is directed to overcoming one or more of the problems as set forth above.

This invention is a mounting for removably associating a first structure with a second structure. The invention includes a first hollow member affixed to the first structure. A second member, having a first portion, is disposed in the first hollow member and affixed thereto by a shock-insulated fastening device. Separate vibration dampening is also provided to prevent vibration imparted to the first hollow member from reaching the second member. The invention also includes means for removably associating the second structure with the second member.

BRIEF DESCRIPTION OF THE DRAWINGS

FIG. 1 is an elevation view of a construction vehicle in which this invention may be utilized.

FIG. 2 is a partial view and in elevation of the pertinent portions of this invention taken generally at section 2—2 of FIG. 1.

FIG. 3 is a detailed side elevation partly in section of one of the vertical members shown in FIG. 2 incorporating the principles of this invention.

FIG. 4 is a sectional view of the vertical member showing FIG. 3 taken at section 4—4.

FIG. 5 is a section of the vertical member shown in FIG. 3 taken at section 5—5.

DETAILED DESCRIPTION OF THE PREFERRED EMBODIMENT

Shown in FIG. 1 is a construction vehicle 5 in the form of a tracked loader. It should be understood that construction vehicle 5 is used only as a means for placing the present invention in context. The invention would be applicable to other vehicles or other situations wherein a first structure such as the construction vehicle 5 must have affixed thereto a second structure such as an operator's station 6 or a roll-over protective structure 7 or a combination of both. In order to further set the invention in context, in this environment, certain mechanical equipment 8, not shown in detail, may be generally located beneath the operator's station 6 thereby requiring the operator's station 6 and, in certain instances, the roll-over protective structure 7, to be removed from the vehicle for maintenance on such equipment. In this particular embodiment, the operator's station 6 and the roll-over protective structure 7 are pivoted at 10 for rotation as indicated in FIG. 1 by means of a jack screw 12. The operator's station and roll-over protective structure are also affixed to the vehicle by a mounting assembly 14 which is shown in greater detail in FIG. 2 with other components of the construction vehicle 5 as shown in FIG. 1 deleted.

In referring to FIG. 2, it can be seen that mounting assembly 14 is comprised of first and second mounting posts of 16 and 18, respectively. Mounting posts 16 and 18 are essentially identical with differences occurring in the particular embodiment as shown in FIG. 2 occurring only in the buttress supports at the base thereof. It should be understood by those skilled in the art that the two mounting posts can be considered interchangeable. Accordingly, mounting post 16 will be discussed in greater detail with the elements in mounting post 16 being duplicative in mounting post 18. It should further be understood that in certain installations it may only be appropriate to utilize the single mounting post 16 affixed to a first structure such as the vehicle frame 20 for mounting a second structure such as operator's station 6 relative the first structure or vehicle frame 20.

Referring now to FIG. 3, the mounting or mounting post 16 is comprised of a first hollow member 22, which may have a generally square cross-section as shown in FIG. 4, although a hollow circular member would be equally applicable. The first hollow member 22 has integrally formed therewith at the base thereof a flange 24 with a plurality of buttress members 26 providing support to the vertically oriented and elongated first hollow member 22. Each buttress member 26 is bonded to the first hollow member 22 by appropriate means such as welding, brazing, or the like. Flange 24 provides a readily accessible surface through which bolts 28 may pass in order to affix the first hollow member 22 to frame 20. Telescopically disposed in hollow member 22 is a first portion 30 of a second member 32 which, in this instance, has a circular cross-section as indicated in FIG. 4. Again, the circular cross-section is non-critical in the same manner that the square cross-section of first hollow member 22 is non-critical thus permitting the use of readily available structural shapes. A second portion 34 of second member 32 extends taperingly outwardly of first hollow member 22 and may have a frustoconical shape. Second portion 34 may be integrally formed with first portion 30 or, as illustrated in FIG. 3, it may be affixed thereto by a weld 36 or the like. Disposed in a bore 38 generally at the midpoint of second member 32 and integrally fixed thereto is a transverse cylindrical member 40.

First hollow member 22 has generally at the midpoint thereof a bore 42 which transpierces opposite sides of the first hollow member and is adapted to receive a pin 44. Bushing means 46 for dampening vibration and reducing road shocks imparted to pin 44 from first hollow member 22 are provided in the form of a resilient member 48 and a sleeve 50 through which pin 44 may pass. Resilient member 48, as can be seen in FIG. 3, surrounds sleeve 50 and is interposed between sleeve 50 and the cylindrical member 40 which is rigidly affixed to first portion 30. The pin 44 may be threaded at each end to receive nuts 52 which may have a washers 54 or the like disposed between the nut 52 and a boss 56 integrally formed on the outside of first hollow member 22 by welding or the like. Boss 56 may serve to add strength to the structure. It should be apparent that pin 44 is the major lateral element to absorb the vertical load imposed upon second member 32 by the operator's station 6 and the roll-over protective structure 7.

First portion 30 of second member 32 has formed about the end distal of second portion 34 an annular groove 58 in which an annular resilient member 60 is disposed. Similarly, an annular groove 64 is formed about the second portion 34 and an annular resilient member 66 is disposed therein. The two annular resilient members 60 and 66 serve to restrain movement of the second member 32 due to lateral loading imposed upon the second portion 34 from the operator's station 6 by roll-over protective structure 7. These resilient members also serve to isolate or dampen vibration or operating shock imparted to first hollow member 22 from the second member 32.

Second portion 34 of second member 32, as noted above, is generally a frustoconical projection or the like extending outwardly of the first hollow member 22. Second portion 34 also has a threaded axial bore 68 for receiving means for fastening the operator's station 6, or the like, to the second member such as bolt 70. Operator's station 6 or the second structure is formed with a subtending socket assembly 72 which includes a first plate 74 and a second plate 76. First plate 74 has therethrough a tapered bore 78 which is concentric with a tapered bore 80 formed in the spatially removed second plate 76. It should be noted that second plate 76 is shown in FIG. 3 as two plate members which should not be considered limiting as one plate member would suffice. The taper of tapered bores 78 and 80 corresponds to the taper of the frustoconical portion of second portion 34 so that the spatially separated first and second plate may come into mating engagement with the frustoconical portion of second portion 34. Second portion 34 may alternatively define a pyramidal shape or the like to provide for alignment with like shaped openings in the first and second plates.

Vertical members 82 and 84 or the like serve to rigidly separate first and second plates 74 and 76, respectively. It should be noted that one of the two plates may serve only as means for alignment with second portion 34 or as a guide, while the second plate serves as the support member. In FIG. 3 it will be apparent to those in the art that plate member 74, which is the uppermost of the two and has the smaller tapered bore, is also the strength member in that it is of greater thickness and in closer proximity to the operator's station 6. Similarly, the second plate 76, which is located adjacent the first hollow member 22, is the larger diameter bore and serves to guide the operator's station 6 into proper alignment with the mounting post 16. Finally, it should be noted that the taper of the frustoconical portion of second portion 34 is such that the two plates 74 and 76 do not become locked with the taper.

Referring again to FIGS. 1 and 2 for a better understanding of the operation, it should be understood that each mounting post 16 and 18 would be assembled in the manner illustrated in FIG. 3 during manufacture of the vehicle. However, if replacement of parts in the mounting structure becomes necessary, the operator's station 6 is first rotated about pivot 10 as indicated in FIG. 1 following removal of the bolts 70 from the second portions 34. Removal of the operator's station 6 from the second portion 34 allows withdrawal of pin 44. Once withdrawal of pin 44 takes place, the second member 32 may be withdrawn from its telescoped position in the first hollow member 22 and replaced or repaired as necessary.

The method of replacement of the second member 32 into the first hollow member 22 is readily apparent in FIG. 3 and the other drawings. Pin 44 is replaced with nuts 52 being tightened thereon. The operator's station 6, as shown in FIG. 1, is then lowered to the operating position about pivot 10 utilizing screw jack 12. As the operator's station 6 approaches the operating position shown in FIG. 1, the tapered bore 80 in first plate 76 overlaps the frustoconical portion of second portion 34 to guide the tapered bore 78 of the second plate into position about the frustoconical shape of second portion 34. Once first plate 74 comes into mating engagement with second portion 34, the bolt 70 may be positioned through a mounting hole in the operator'station 6 so that the operator's station 6 is retained in the rigid connection of the second member 32, while remaining in a resiliently supported state to dampen vibration.

As can be seen in FIG. 2, the operator's station 6 engages both the first mounting post 16 and the second mounting post 18 which serves to provide better support than a single mounting post. Important to this invention is the position of pin 44 generally at the midpoint of first portion 30 of the second member 32 as such positioning reduces lateral moments acting on pin 44, since the lateral moment would be relieved by the resilient members 60 and 66 while a vertical load, which includes the static load, is absorbed in pin 44. Further, the use of the frustoconical-like shape of second portion 34 of second member 32 allows removal of the major static load from the mounting member without the necessity of removing pin 44 and the associated resilient structure. The tapered surface of the frustoconical-like second portion eases the disassembly or raising of the operator's station 6 from the position shown in FIG. 1. Finally, the frustoconical-like shape, or alternatively a frustopyramidal-like shape, effectively eliminates the shear load on bolt 70.

Although this invention has been described in relation to the mounting of an operator's station and a rollover protective structure on a construction vehicle, it is to be understood that other uses of such a mounting to position a second structure relative a first structure should be apparent to those skilled in the art. Further, the invention should not be considered limited to the sole embodiment, but should be considered as limited only by the following claims.

Embodiments of the invention in which an exclusive property or privilege is claimed are defined as follows:

1. A mounting for removably associating a first structure with a second structure comprising:
 a first hollow member affixed to said first structure;
 a second member having a first portion disposed in said first hollow member; and a frustoconical-like extension integrally connected to said first portion and forming a second portion of said second member, said frustoconical-like extension extending outwardly of said first hollow member;
 vibration-insulated fastening means for fixedly associating said first portion of said second member with said first hollow member; separate means insulating said second member from vibration imparted to said first hollow member;
 means for removably associating said second structure with said second member including; a first plate defining a tapered opening therethrough; a second plate defining a tapered opening therethrough and of relatively larger size than said opening in said first plate; and means for associating said first and second plates with said second structure in a spaced apart relation with the axes of said tapered openings concentric so that said first and said second tapered openings may be placed in an overlapping relationship with said frustoconical-like extension.

2. The mounting of claim 1 wherein the first hollow member is elongated and is affixed at one end to said first structure and defines a transverse bore perpendicular to the longitudinal axis of the first hollow member; and wherein the first portion of the second member defines a transverse bore perpendicular to the longitudinal axis of said first portion and generally at the midpoint of said first portion, said first portion including a sleeve member affixed in said first portion transverse bore; and further wherein said vibration-insulating fastening means comprises:
 resilient bushing means adapted to be received in said sleeve member and bolt means, said resilient bushing means for receiving said bolt means with said bolt means disposed in said transverse bore of the first hollow member while insulating said second portion from vibration transmitted thereto from said first hollow member by said bolt means.

3. The mounting of claim 2 wherein the separate means for insulating the second member from vibration imparted thereto from the first hollow member comprises a first annular resilient member disposed about the one end of the second portion of the second member proximate the first portion, and a second annular resilient member disposed about the end of the first portion of the second member distal of the second portion so that with the first portion disposed in said first hollow member, said second member is resiliently restrained from contact with said first hollow member.

4. The mounting of claim 1 wherein the means for removably associating the second structure to the second member further comprises bolt means; and further wherein said frustoconical-like extension defines a threaded axial bore in the top surface thereof; said bolt means threadably engageable in said threaded axial bore for affixing said second structure to said second member with said first and second plates in overlapping relation with said frustoconical extension.

5. The mounting of claim 4 wherein the first hollow member is non-circular in cross-section.

6. A mounting for affixing a pivoted operator's station to a vehicle, the vehicle including frame means for supporting vehicle components; the mounting comprising:
 a first elongated hollow member affixed at one end to said frame and defining a transverse bore perpendicular to the longitudinal axis thereof;
 a second member having a first portion of circular cross section telescopically disposed in said first hollow member and a frustoconical second portion extending outwardly of said first hollow member, said second member defining a transverse bore perpendicular to the longitudinal axis of said first portion and generally at midpoint of said first portion, said first portion including a sleeve member affixed in said first transverse bore;
 resilient bushing means adapted to be received in said sleeve member and bolt means, said resilient bushing means for receiving said bolt means with said bolt means disposed in said transverse bore of said first hollow member while insulating said second portion from vibration transmitted thereto from said first hollow member by said bolt means;
 separate means for insulating said second member from vibration imparted to said first hollow member by said vehicle frame; and,
 means for removably associating said operator's station with said second member.

7. The mounting of claim 6 wherein the separate means for insulating the second member from vibration imparted thereto from the first hollow member comprises a first annular resilient member disposed about the end of the second portion of the second member proximate the first portion, and a second annular resilient member disposed about the end of the first portion of the second member distal of the second portion so that with the first portion disposed in said first hollow member, said second member is resiliently restrained from contact with said first hollow member.

8. The mounting of claim 7 wherein the means for removably associating the operator's station to said second member comprises:
   a first plate defining a tapered bore therethrough;
   a second plate defining a tapered bore of relatively larger size than said first plate; and
   means for associating said first and second plates with said operator's station in a spaced apart relation with the axes of said tapered bores concentric, so that said first and second tapered bores may be placed in an overlapping relation with the frustoconical extension.

9. The mounting of claim 8 wherein the means for removably associating the operator's station to the second member further comprises bolt means; and further wherein said frustoconical extension defines a threaded axial bore in the top surface thereof; said bolt means threadably engageable in said threaded axial bore for affixing said operator's station to said second member with said first and second plates in overlapping relation with said frustoconical extension.

10. A mounting for removably associating a first structure with a second structure comprising:
   a first hollow member affixed to said first structure;
   a second member having a first portion disposed in said first hollow member and a second portion affixed at one end thereof to said first portion, said second portion extending taperingly outwardly of said first hollow member;
   vibration-insulated fastening means for fixedly associating said first portion of said second member with said first hollow member;
   a first plate defining a tapered opening therethrough;
   a second plate defining a tapered opening therethrough, said opening of relatively larger size than said opening in said first plate; and
   means for associating said first and second plates with said second structure in a spaced apart relation with the axes of said tapered openings concentric, so that said first and second tapered openings may be placed in an overlapping relation with the outwardly tapering second portion.

11. The mounting of claim 10 wherein the first hollow member is elongated and is affixed at one end to said first structure and defines a transverse bore perpendicular to the longitudinal axis of the first hollow member; and wherein the first portion of the second member defines a transverse bore perpendicular to the longitudinal axis of said first portion and generally at the midpoint of said first portion, said first portion including a sleeve member affixed in said first portion transverse bore; and further wherein said vibration-insulating fastening means comprises:
   resilient bushing means adapted to be received in said sleeve member and bolt means, said resilient bushing means for receiving said bolt means with said bolt means disposed in said transverse bore of the first hollow member while insulating said second portion from vibration transmitted thereto from said first hollow member by said bolt means.

12. The mounting of claim 11 wherein the separate means for insulating the second member from vibration imparted thereto from the first hollow member comprises a first annular resilient member disposed about the one end of the second portion of the second member proximate the first portion, and a second annular resilient member disposed about the end of the first portion of the second member distal of the second portion so that with the first portion disposed in said first hollow member, said second member is resiliently restrained from contact with said first hollow member.

* * * * *